Jan. 2, 1923.

1,440,474

T. F. LEDBETTER.
FRONT WHEEL DRIVING MECHANISM.
ORIGINAL FILED FEB. 16, 1920

Inventor:
Thomas F. Ledbetter,
By Cushman, Bryant & Darby
Att'ys.

Patented Jan. 2, 1923.

1,440,474

UNITED STATES PATENT OFFICE.

THOMAS F. LEDBETTER, OF COLUMBUS, GEORGIA.

FRONT-WHEEL DRIVING MECHANISM.

Original application filed February 16, 1920, Serial No. 359,098. Divided and this application filed October 13, 1921. Serial No. 507,469.

*To all whom it may concern:*

Be it known that I, THOMAS F. LEDBETTER, a citizen of the United States, residing at Columbus, in the county of Muscogee and State of Georgia, have invented new and useful Improvements in Front-Wheel Driving Mechanism, of which the following is a specification.

This invention relates to a four-wheel drive mechanism for motor vehicles of the type disclosed in my co-pending application, Serial No. 359,098, filed February 16, 1920, of which this application is a division.

The subject matter of this invention relates more particularly to the driving mechanism for the front wheels, and has as its object the provision of an extremely simple arrangement for transmitting power to these wheels.

In a prior Patent, No. 1,258,126, granted to me, there is shown a specific form of front wheel drive construction, in which the front wheel is located within a yoke pivotally connected to the front axle, and is supported entirely by its drive shaft. An object of this invention is to support the front wheels entirely from the axle, and, more specifically, upon spindles pivotally connected to the axis, thus taking from the drive shafts the weight of the vehicle.

Another object of the invention is to eliminate the yoke extending over the front wheels, and to render the axle and wheel spindle construction more compact, sightly and durable.

With the above and other objects of a more specific nature in mind I have shown in the accompanying drawings one form of a device in which the invention may be embodied, and in these drawings:—

Figure 1:
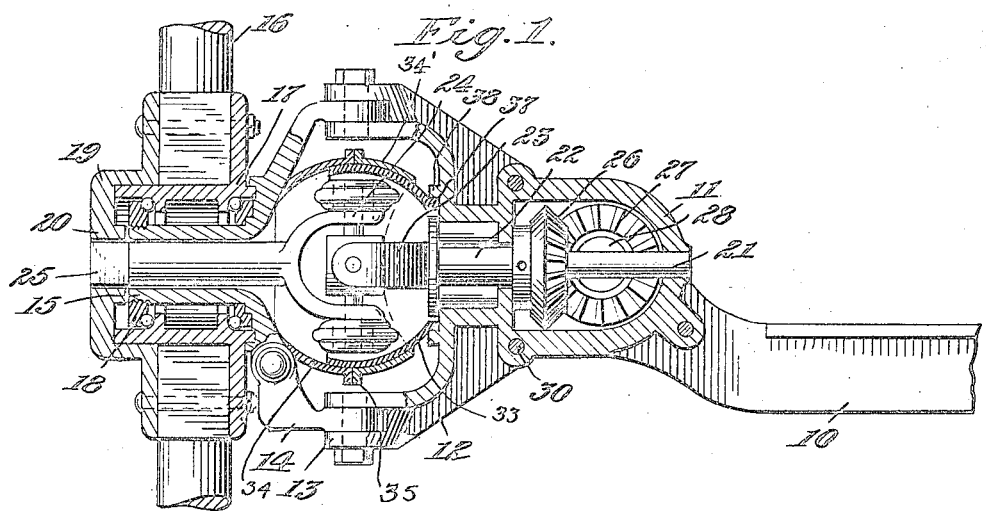
Figure 2:
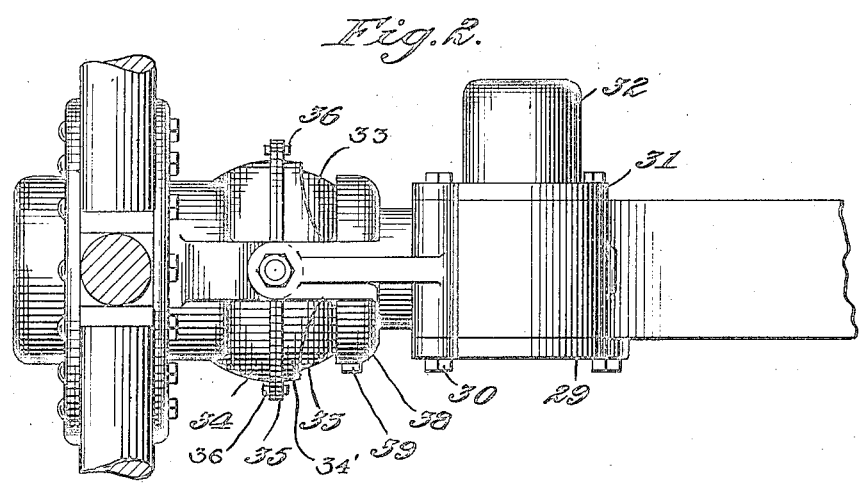

Fig. 1 is a front sectional elevational view of a portion of a front axle, as much of the wheel being shown as is necessary to properly illustrate the invention, and Fig. 2 is a top plan view of that portion of the device shown in Fig. 1.

Referring to the drawings for a more detailed description, 10 indicates a front axle having formed adjacent each end an integral gear housing 11 and a pair of spaced upwardly and downwardly extending arms 12. The extremities of each arm are forked, as indicated at 13, to provide spaced ears which receive between them and are pivotally connected to the ends of arms 14 upon a hollow spindle 15 supporting the front wheel 16. The wheel is provided with the usual hub 17 mounted upon bearings 18 and has a hub cap 19 provided with a central socket 20 for the purpose of establishing driving connection between the driving shaft and the wheel.

Mounted in bearings 21, 22 in the axle is a stub shaft 23 having a joint 24 in alinement with the pivotal connections between the spindle and axle. The shaft extends through the spindle and has a squared or otherwise angularly shaped end 25 fitting into the hub cap socket. A bevel gear 26 is fixedly mounted upon the shaft within the housing 11 and meshes with a bevel gear 27 upon a shaft 28, which transmits power from the differential mechanism set forth in my co-pending application above referred to. The gears 26 and 27 are enclosed within the housing by a front cap plate 29 bolted to the axle as at 30 and a rear bearing plate 31 provided with a central bearing 32 for the shaft 28.

The stub shaft joint 24 is preferably enclosed within a housing adapted to contain a suitable lubricant. A suitable housing is shown in the drawings and comprises a pair of substantially hemispherical sections 33, 34, the latter section having a flange 35 to which is secured, by means of bolts 36, an extension section 34' overlying the section 33. The section 34 is formed on or suitably secured to arms 14 and the section 33 is secured within a flange 38 upon the axle by means of a bolt or set screw 39. It will be noted, upon an inspection of the views, that the sides of the extension sections 34' are cut away so as to permit of turning movement of the wheel spindle.

From the above description it will be seen that the front wheels are entirely supported by the spindles 15 which are pivotally secured to the axles by the spaced arms 14; and the arms being located in substantially the same vertical plane, will readily support the weight of the vehicle. When it is desired to break the driving connections between the stub shafts and the hub caps it is merely necessary to replace the hub caps 19 by others which are not provided with sockets of a shape which will cooperate with the ends of the stub shafts. It should further be observed that both the stub shaft joint and the gears are entirely enclosed within the housing, which will maintain lubricants for considerable periods, thus preserving the joint and gears against wear.

I claim:

In a four-wheel drive, front wheels, hollow wheel spindles upon which the wheels are supported, a pair of spaced arms at the inner end of each spindle, an axle having adjacent each end an integral closed gear housing, a removable cap for each housing, a pair of spaced arms at each end of the axle, each arm being pivotally connected to a spindle arm, stub shafts journalled in the ends of said axle and extending through the spindles, each shaft having a gear thereon in one of said housings and a flexible joint located between the pivotal connection of the axle and spindle arms, said shafts having angular outer ends, and means upon the wheels having sockets to receive the ends of said shafts and establish driving connection between the shafts and the wheels.

In testimony whereof I have hereunto set my hand.

THOMAS F. LEDBETTER.